(12) United States Patent
Feng et al.

(10) Patent No.: US 8,519,985 B2
(45) Date of Patent: Aug. 27, 2013

(54) TOUCH SCREEN DEVICE

(75) Inventors: Yu-Ling Feng, Shenzhen (CN);
Yong-Gang Zhang, Shenzhen (CN);
Kuan-Hung Chen, Shindian (TW)

(73) Assignees: Shenzhen Futaihong Precision Industry Co., Ltd., Shenzhen (CN);
FIH (Hong Kong) Limited, Kowloon (HK)

( * ) Notice: Subject to any disclaimer, the term of this patent is extended or adjusted under 35 U.S.C. 154(b) by 226 days.

(21) Appl. No.: 13/010,936

(22) Filed: Jan. 21, 2011

(65) Prior Publication Data
US 2012/0019458 A1 Jan. 26, 2012

(30) Foreign Application Priority Data
Jul. 23, 2010 (CN) .......................... 2010 1 0235413

(51) Int. Cl.
*G06F 3/033* (2013.01)
*G06F 3/041* (2006.01)

(52) U.S. Cl.
USPC ...... 345/179; 345/173; 178/19.07; 604/890.1

(58) Field of Classification Search
USPC ........ 401/99, 109, 195; 455/566; 200/61.59;
307/116, 150; 250/222.1, 252.1; 345/156,
345/157, 158, 160, 163, 173, 174, 177, 179,
345/182, 183; 348/47, E13.074; 178/18.01,
178/18.02, 19.01, 19.02, 19.03, 19.04, 19.05,
178/19.07; 340/1.1, 568.1; 604/890.1
See application file for complete search history.

(56) References Cited

U.S. PATENT DOCUMENTS

| 4,672,154 | A | * | 6/1987 | Rodgers et al. ............ 178/19.07 |
| 5,898,290 | A | * | 4/1999 | Beard et al. .................... 307/150 |
| 6,558,320 | B1 | * | 5/2003 | Causey et al. ................. 600/300 |
| 6,681,333 | B1 | * | 1/2004 | Cho .............................. 713/300 |
| 2007/0093786 | A1 | * | 4/2007 | Goldsmith et al. ........ 604/890.1 |
| 2007/0224504 | A1 | * | 9/2007 | Kita et al. .................. 429/231.1 |
| 2009/0167698 | A1 | * | 7/2009 | Altas et al. .................... 345/173 |

* cited by examiner

*Primary Examiner* — Quan-Zhen Wang
*Assistant Examiner* — Michael J Eurice
(74) *Attorney, Agent, or Firm* — Altis Law Group, Inc.

(57) ABSTRACT

A touch screen device includes a circuit board, a power input port located on the circuit board, a main battery electronically connected to the power input port, and a stylus. A backup battery electronically connected to the power input port is located in the stylus. A power control unit is located on the circuit board. The power control unit detects the voltage value of the main battery, and compares the voltage value of the main battery with a predetermined voltage of the touch screen device. According to the comparative result, the power control unit switches between the main battery and the backup battery to provide power supply to the touch screen device.

9 Claims, 6 Drawing Sheets

TOUCH SCREEN DEVICE

BACKGROUND

1. Technical Field

The present disclosure relates to touch screen devices, and more particularly, to a touch screen device that includes a backup battery.

2. Description of Related Art

Touch screen devices such as laptop computers, mobile phones and personal digital assistants (PDAs), are widely used. Generally, the touch screen device includes a main body and a stylus for controlling cursors or inputting characters. The main body defines a receiving slot for receiving the stylus.

Batteries currently power touch screen devices. When the battery runs out, the touch screen device will stop working and power off to enable battery replacement. A conventional touch screen device includes a main battery and a backup battery for providing power in the absence of the main battery. The backup battery is located in the main body of the touch screen device and takes up considerable space.

Therefore, there is a room for improvement within the art.

BRIEF DESCRIPTION OF THE DRAWINGS

Many aspects of the present touch screen device can be better understood with reference to the following drawings. The components in the various drawings are not necessarily drawn to scale, the emphasis instead being placed upon clearly illustrating the principles of the present touch screen device.

DETAILED DESCRIPTION

Reference will now be made to the drawings to describe various exemplary embodiments of the present disclosure in detail.

Figure 1:
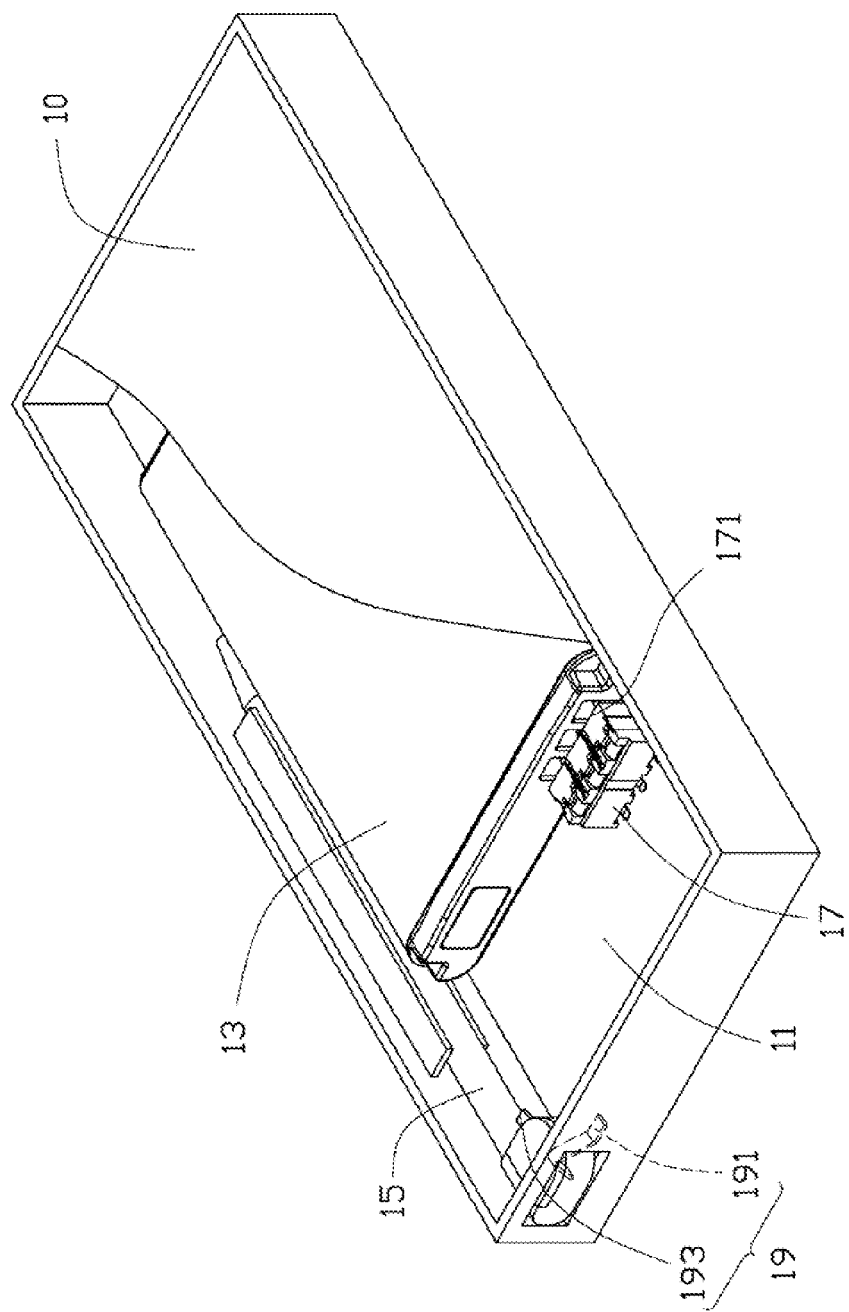
FIG. 1 is a schematic view of a touch screen device, according to a first exemplary embodiment of the present disclosure.
Figure 3:
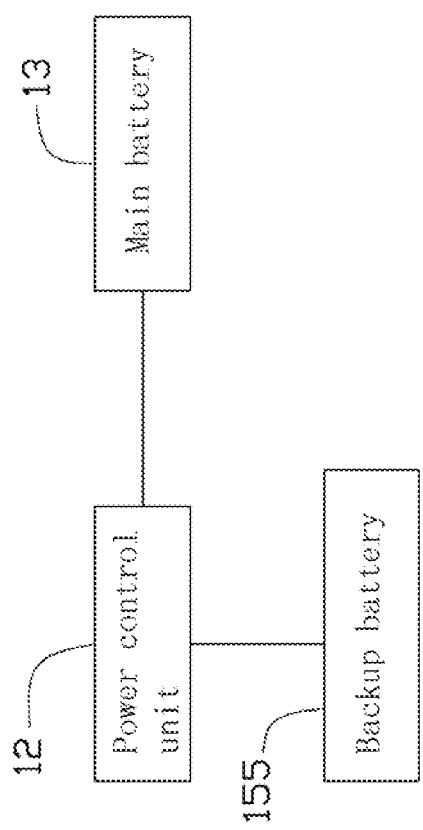
FIG. 3 is a block diagram of a switch circuit of the touch screen device.

Referring to FIG. 1, a touch screen device 10 according to a first exemplary embodiment of the present disclosure, includes a circuit board 11, a main battery 13 and a stylus 15. A power input port 17 and a conductive mechanism 19 are located on the circuit board 11. Referring to FIG. 3, a power control unit 12 is located on the circuit board 11. The conductive mechanism 19 is electronically connected to the power input port 17 through electrical wiring (not shown) on the circuit board 11 or a flexible connection (not shown), such as a flexible circuit board. The main battery 13 is electronically connected to the power input port 17.

Figure 2:
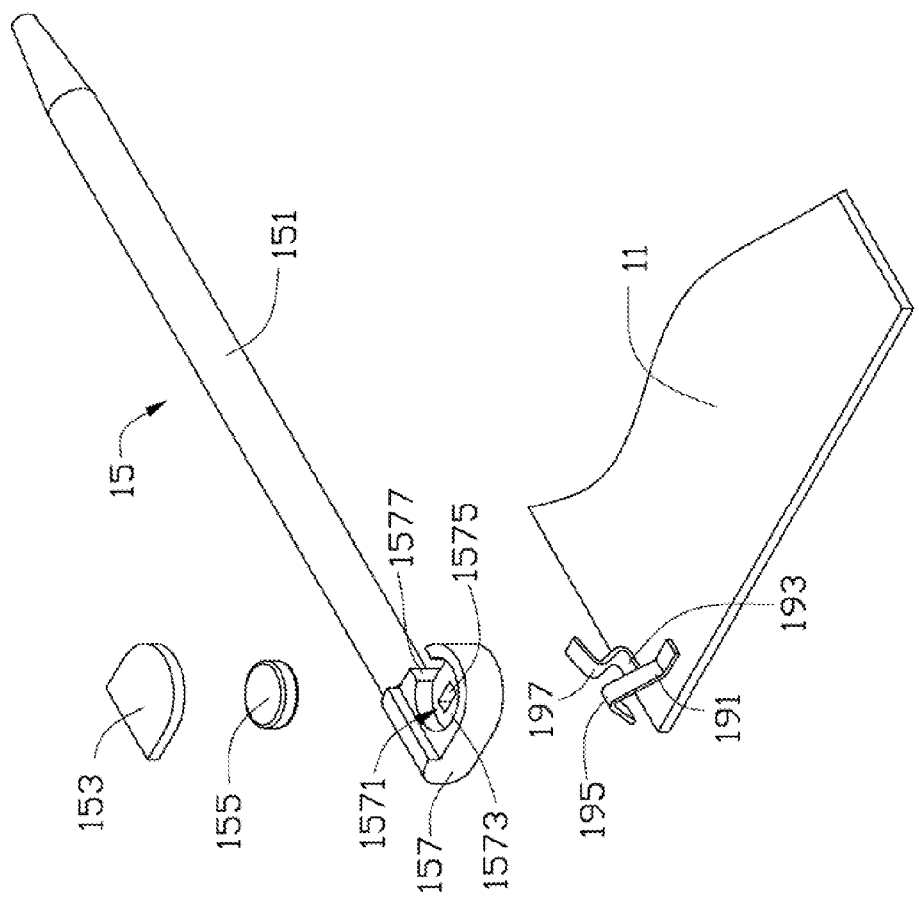
FIG. 2 is an exploded view of a stylus and a conductive mechanism shown in FIG. 1.

Referring to FIG. 2, the stylus 15 includes a body portion 151, an end cover 153, and a backup battery 155. An extension portion 157 is extended from one end of the body portion 151. The extension portion 157 defines a receiving groove 1571 for receiving the backup battery 155. In this exemplary embodiment, the backup battery 155 is a button battery. The end cover 153 is located on the receiving groove 1571 to fix the backup battery 155. The receiving groove 1571 includes a bottom surface 1573. A through hole 1575 is defined on the bottom surface 1573. An opening 1577 is defined on a side surface of the extension portion 157.

Referring to FIG. 1 and FIG. 2, the power input port 17 includes a plurality of connection terminals 171. The plurality of connection terminals 171 are electronically connected to the main battery 13. The conductive mechanism 19 includes a first contact 191 and a second contact 193. The first contact 191 and the second contact 193 are electronically connected to the power input port 17 through electrical wiring (not shown) on the circuit board 11. The first contact 191 includes a first bent portion 195 located in the through hole 1575, the first bent portion 195 is attached to a positive terminal of the backup battery 155. The second contact 193 includes a second bent portion 197 located in the opening 1577, and the second bent portion 197 is attached to a negative terminal of the backup battery 155.

Referring to FIG. 3, as previously mentioned, a power control unit 12 is located on the circuit board 11. The main battery 13 and the backup battery 155 are electronically connected to the power control unit 12. The power control unit 12 is applied to switch between the main battery 13 and the backup battery 155 to provide power supply to the touch screen device 10.

Figure 4:
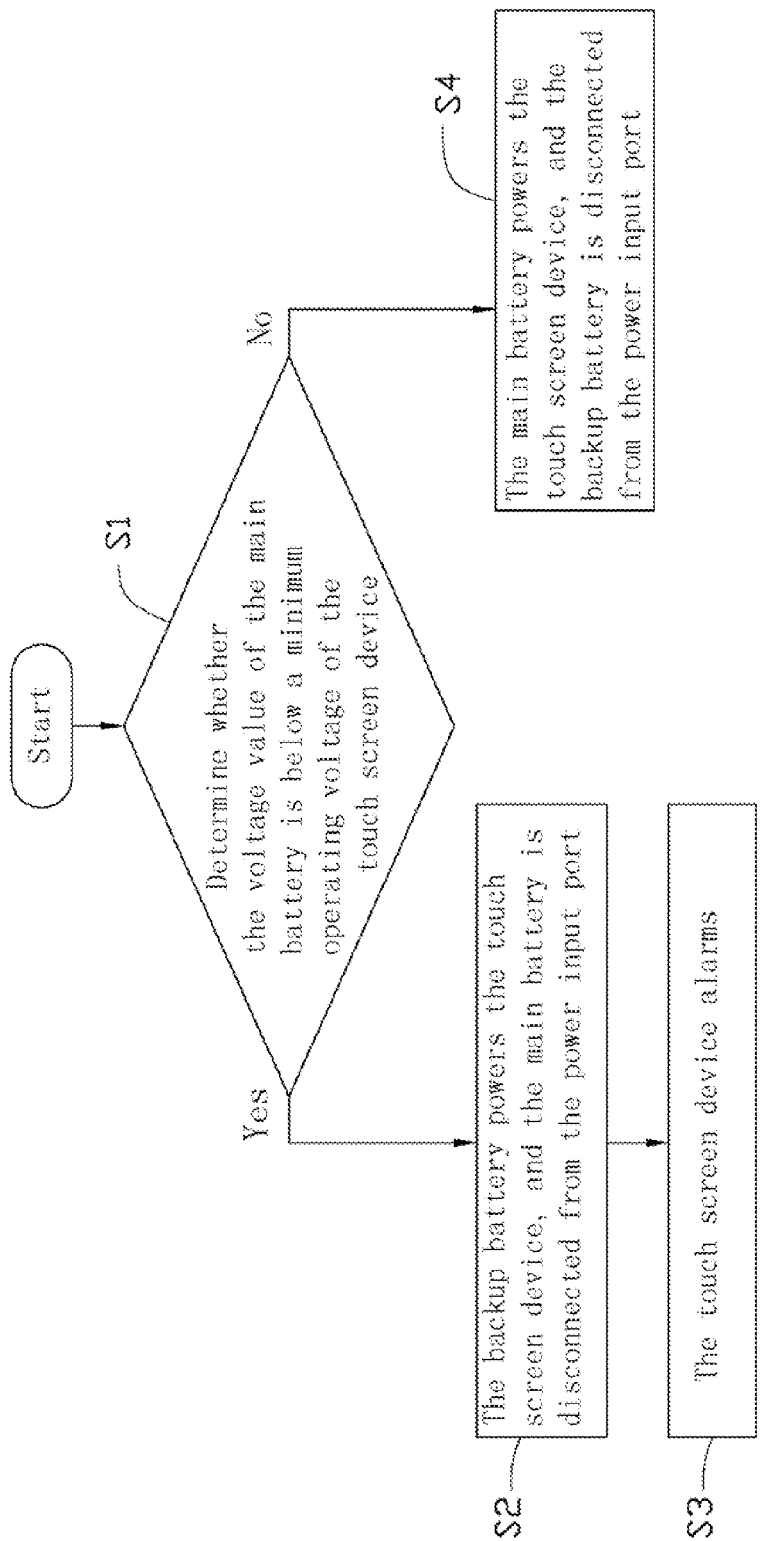
FIG. 4 is a flowchart illustrating a process for switching between a main battery and a backup battery of the touch screen device.

Referring to FIG. 4, a process for switching between the main battery 13 and the backup battery 155 of the touch screen device 10 is as follows:

In step S1, the power control unit 12 detects the voltage value of the main battery 13 and determines whether the voltage value of the main battery 13 is below a minimum operating voltage of the touch screen device 10 such as 3 volts. If the voltage value of the main battery 13 is below the minimum operating voltage, step S2 is implemented. If the voltage value of the main battery 13 is not below the minimum operating voltage, step S4 is implemented.

In step S2, the backup battery 155 powers the touch screen device 10, and the main battery 13 is disconnected from the power input port 17 under the control of the power control unit 12.

In step S3, the touch screen device 100 alarms to remind users to replace the main battery 13 under the control of the power control unit 12.

In step S4, the main battery 13 powers the touch screen device 10, and the backup battery 155 is disconnected from the power input port 17 under the control of the power control unit 12.

The backup battery 155 provides temporary power to the touch screen device 10 when the main battery 13 needs to be replaced. When the replacement of the main battery 13 is completed, a new main battery 13 starts to power the touch screen device 10 again. Therefore, the main battery 13 can be replaced without interrupting the operation of the touch screen device 10. Furthermore, the backup battery 155 located in the stylus 15 saves internal space of the touch screen device 10.

Figure 5:
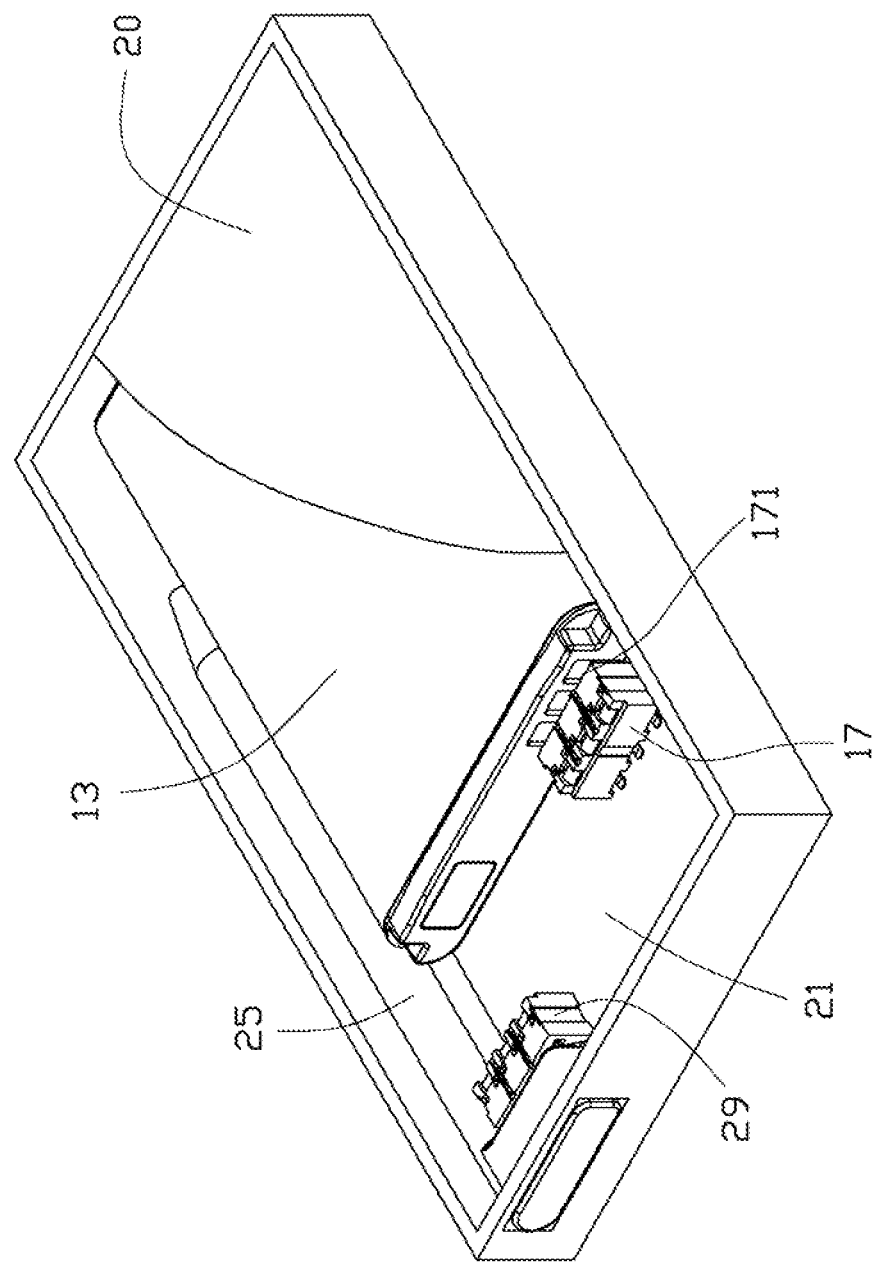
FIG. 5 is a schematic view of a touch screen device, according to a second exemplary embodiment of the present disclosure.
Figure 6:
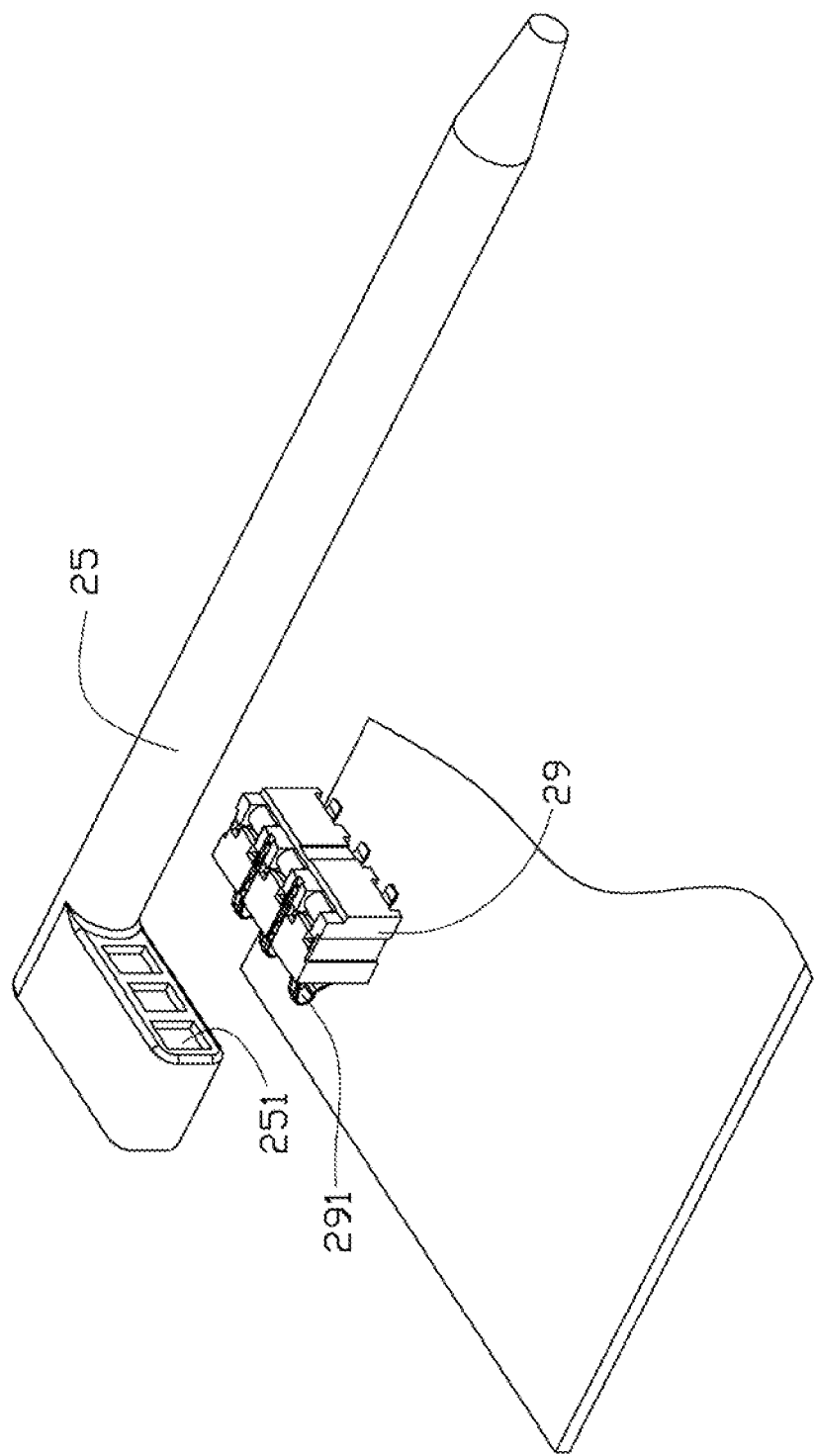
FIG. 6 is an unassembled view of a stylus and a connector shown in FIG. 5.

Referring to FIG. 5 and FIG. 6, a touch screen device 20 according to a second exemplary embodiment of the present disclosure, includes a circuit board 21, a main battery 13, and a stylus 25. A power input port 17 and a connector 29 electronically connected to the power input port 17 are located on the circuit board 21. The power input port 17 is electronically connected to the main battery 13. The connector 29 is electronically connected to the stylus 25.

The stylus 25 is hollow and filled with rechargeable battery materials. In this exemplary embodiment, the rechargeable battery materials may be Nickel-metal hydride (Ni-MH) battery material or lithium-ion (Li-ion) battery material. The stylus 25 includes at least two electrical contacts 251. The connector 29 includes at least two connect terminals 291 corresponding to the at least two electrical contacts 251. The at least two connect terminals 291 are electronically connected to the power input port 17 by electrical wiring (not shown) on the circuit board 21.

The process for switching the main battery 13 and the stylus 25 of the touch screen device 20 is the same as the process for switching the main battery 13 and the backup battery 155 of the touch screen device 10.

The stylus 25 provides temporary power to the touch screen device 20 when the main battery 13 needs to be replaced. When the replacement of the main battery 13 is completed, a new main battery 13 starts to power the touch screen device 20 again. Therefore, the main battery 13 can be replaced without interrupting the operation of the touch screen device 20. Furthermore, the stylus 25 functions as a backup battery and saves internal space of the touch screen device 20.

The minimum operating voltage of the touch screen device 100 may be referred to as a predetermined voltage.

It is to be further understood that even though numerous characteristics and advantages of the present exemplary embodiments have been set forth in the foregoing description, together with details of structures and functions of various exemplary embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A touch screen device, comprising:
a circuit board including a power control unit;
a power input port located on the circuit board;
a main battery electronically connected to the power input port; and
a stylus including a backup battery electronically connected to the power input port, the stylus further comprising a body portion and an extension portion extending from one end of the body portion, the extension portion defining a receiving groove for receiving the backup battery, the receiving groove comprising a bottom surface, a through hole being defined on the bottom surface; an opening being defined on a side surface of the extension portion;
wherein the power control unit detects the voltage value of the main battery, and compares the voltage value of the main battery with a predetermined voltage of the touch screen device; according to the comparative result, the power control unit switches between the main battery and the backup battery to provide power supply to the touch screen device; if the voltage value of the main battery is below the predetermined voltage needed to operate the touch screen device, the backup battery powers the touch screen device, and the main battery is disconnected from the power input port under the control of the power control unit; if the voltage value of the main battery is not below the predetermined voltage needed to operate the touch screen device, the main battery powers the touch screen device, and the backup battery is disconnected from the power input port under the control of the power control unit.

2. The touch screen device as claimed in claim 1, wherein the stylus further comprises an end cover, the end cover is located on the receiving groove to fix the backup battery.

3. The touch screen device as claimed in claim 1, wherein a conductive mechanism electronically connected to the power input port is located on the circuit, the backup battery is electronically connected to the power input port through the conductive mechanism.

4. The touch screen device as claimed in claim 3, wherein the conductive mechanism comprises a first contact and a second contact, the first contact comprises a first bent portion located in the through hole, and the first bent portion is attached to the backup battery; the second contact comprises a second bent portion located in the opening, and the second bent portion is attached to the backup battery.

5. A touch screen device, comprising:
a circuit board;
a power input port located on the circuit board;
a main battery electronically connected to the power input port; and
a stylus functioning as a backup battery;
wherein the stylus is electronically connected to the power input port; a power control unit is located on the circuit board, the power control unit detects the voltage value of the main battery, and compares the voltage value of the main battery with a predetermined voltage of the touch screen device; according to the comparative result, the power control unit switches between the main battery and the stylus to provide power supply to the touch screen device; if the voltage value of the main battery is below the predetermined voltage needed to operate the touch screen device, the stylus powers the touch screen device, and the main battery is disconnected from the power input port under the control of the power control unit; if the voltage value of the main battery is not below the predetermined voltage needed to operate the touch screen device, the main battery powers the touch screen device, and the stylus is disconnected from the power input port under the control of the power control unit.

6. The touch screen device as claimed in claim 5, wherein the stylus is hollow and filled with rechargeable battery materials.

7. The touch screen device as claimed in claim 6, wherein the rechargeable battery materials is Nickel-metal hydride (Ni-MH) battery material or lithium-ion (Li-ion) battery material.

8. The touch screen device as claimed in claim 6, wherein a connector is located on the circuit board, the stylus is electrically connected to the power input port through the connector.

9. The touch screen device as claimed in claim 8, wherein at least two electrical contacts are located on one end of the stylus, the connector comprises at least two connect terminals corresponding to the at least two electrical contacts.

* * * * *